US008851579B2

(12) United States Patent
Ohkubo et al.

(10) Patent No.: US 8,851,579 B2
(45) Date of Patent: Oct. 7, 2014

(54) VEHICLE BRAKE DEVICE AND VEHICLE BRAKE DEVICE CONTROL METHOD

(75) Inventors: Naoto Ohkubo, Wako (JP); Takashi Nishioka, Wako (JP); Arata Inoue, Wako (JP); Kunimichi Hatano, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 137 days.

(21) Appl. No.: 13/578,342

(22) PCT Filed: Feb. 23, 2011

(86) PCT No.: PCT/JP2011/053928
§ 371 (c)(1),
(2), (4) Date: Aug. 10, 2012

(87) PCT Pub. No.: WO2011/105405
PCT Pub. Date: Sep. 1, 2011

(65) Prior Publication Data
US 2012/0306260 A1   Dec. 6, 2012

(30) Foreign Application Priority Data
Feb. 26, 2010 (JP) .................. 2010-042928

(51) Int. Cl.
| B60T 13/58 | (2006.01) |
| B60T 11/20 | (2006.01) |
| B60T 8/40 | (2006.01) |
| B60T 13/68 | (2006.01) |
| B60T 13/66 | (2006.01) |
| B60T 7/04 | (2006.01) |

(52) U.S. Cl.
CPC .............. B60T 7/042 (2013.01); B60T 8/4081 (2013.01); B60T 13/686 (2013.01); B60T 13/662 (2013.01)

USPC .... 303/14; 303/113.2; 303/113.4; 303/114.1; 303/115.2

(58) Field of Classification Search
USPC ............... 303/14, 114.1, 113.4, 115.4, 116.1, 303/115.2, 3, 6.01, 112.13, 115.1, 11, 13, 303/157, 158
See application file for complete search history.

(56) References Cited

U.S. PATENT DOCUMENTS 4,793,663 A * 12/1988 Ocvirk et al. .............. 303/116.1
6,315,370 B1 * 11/2001 Feigel et al. ................ 303/115.2

(Continued)

FOREIGN PATENT DOCUMENTS

| JP | 02060867 A * 3/1990 | ................ B60T 8/48 |
| JP | 2006-264675 A 10/2006 | |

(Continued)

Primary Examiner — Anna Momper
Assistant Examiner — San Aung
(74) Attorney, Agent, or Firm — Carrier Blackman & Associates, P.C.; William D. Blackman; Joseph P. Carrier

(57) ABSTRACT

In a BBW type vehicle brake device, first and second fluid paths that are connected to each other are both connected to a slave cylinder with a simple structure that is equipped with a single fluid pressure chamber, thereby enabling wheel cylinders having two lines to be operated and eliminating the need for a complicated tandem type slave cylinder. When the slave cylinder becomes inoperable due to malfunction of the power supply, by opening first and second master cut valves and closing the communication control valve, braking is carried out by means of brake fluid pressure generated by a master cylinder. In this process, since the interconnection between the first and second fluid paths is blocked by closing the communication control valve, even if the wheel cylinder of one of the brake lines suffers from a liquid leakage malfunction, the other remained brake line is enabled to ensure a braking force.

16 Claims, 6 Drawing Sheets

(56) References Cited

U.S. PATENT DOCUMENTS

2006/0066146 A1* 3/2006 Otomo .................. 303/151
2007/0114842 A1* 5/2007 Ohkubo et al. ............ 303/115.1

FOREIGN PATENT DOCUMENTS

| | | |
|---|---|---|
| JP | 2008-230362 A | 10/2008 |
| JP | 2009-161130 A | 7/2009 |

* cited by examiner

WHEN POWER SUPPLY IS OFF

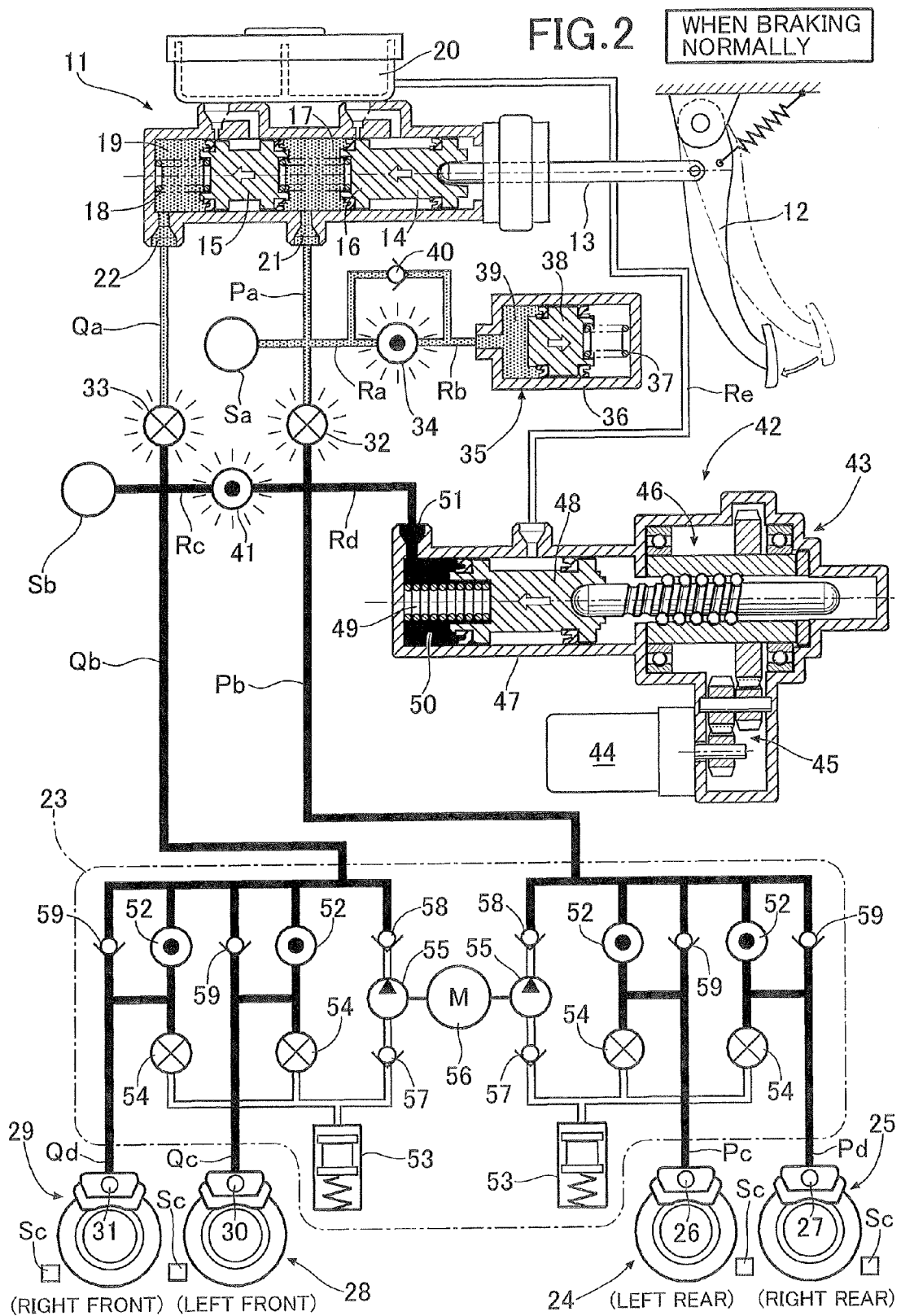
FIG.2 WHEN BRAKING NORMALLY

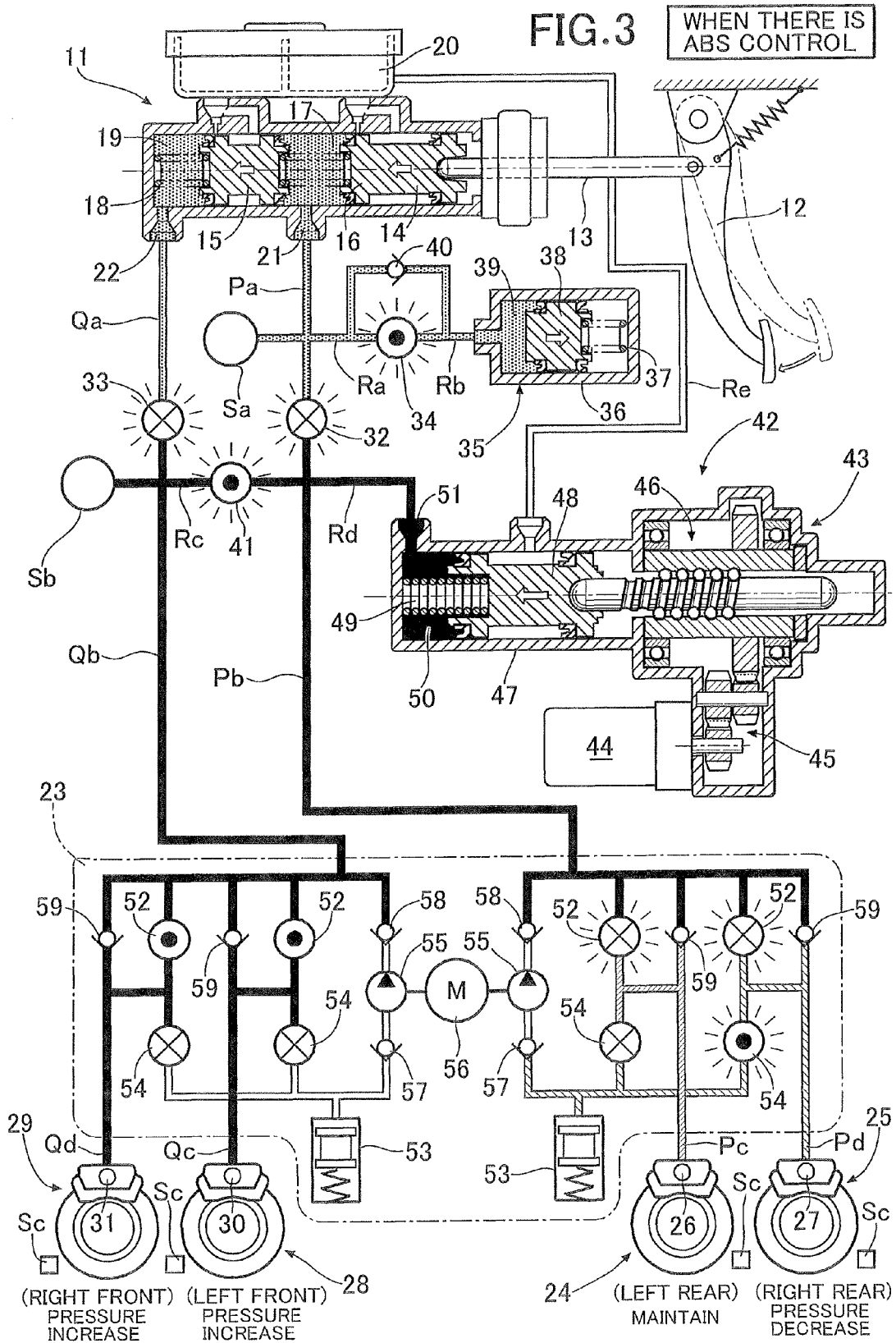
FIG.3 WHEN THERE IS ABS CONTROL

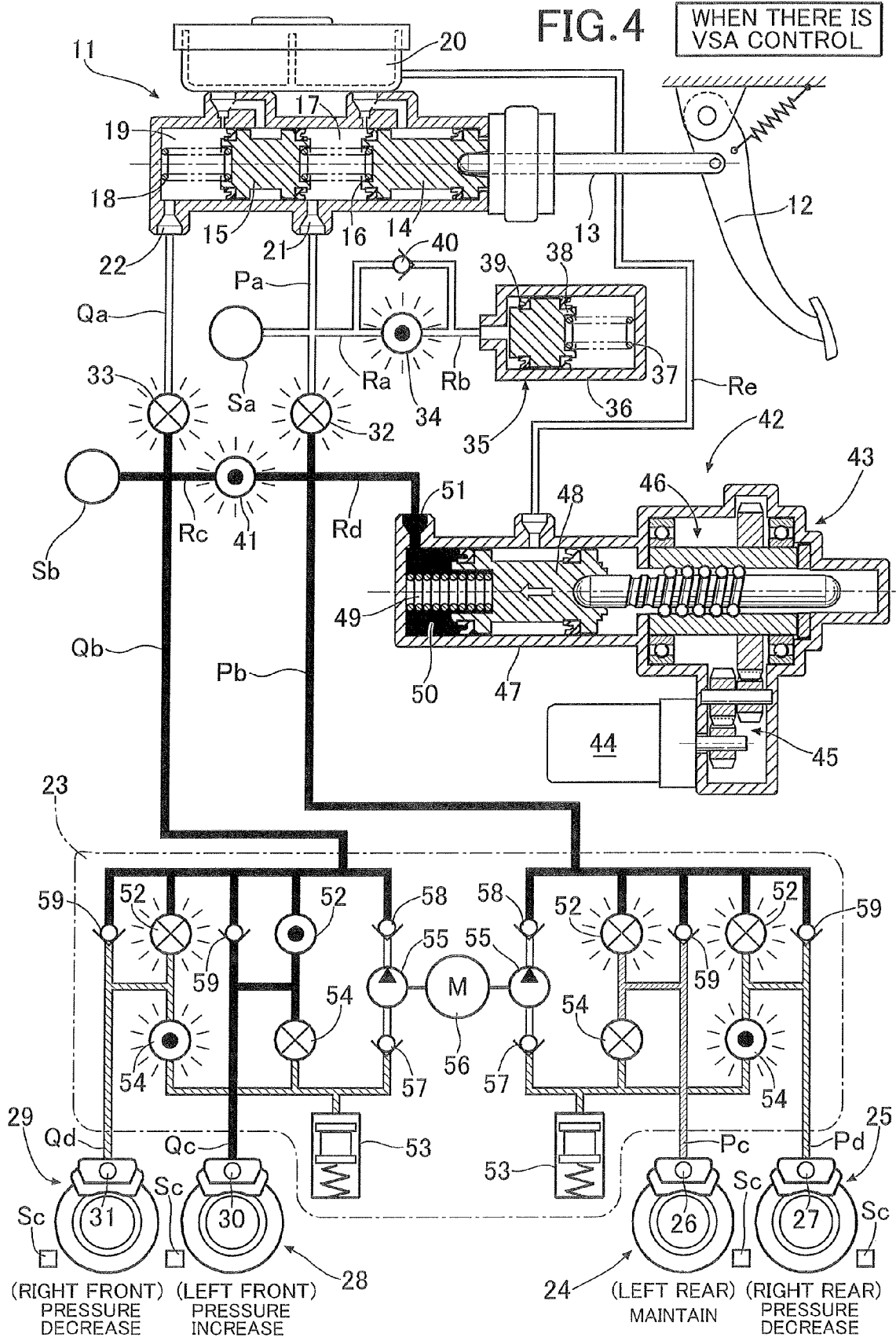
FIG.4 WHEN THERE IS VSA CONTROL
(RIGHT FRONT) PRESSURE DECREASE
(LEFT FRONT) PRESSURE INCREASE
(LEFT REAR) MAINTAIN
(RIGHT REAR) PRESSURE DECREASE

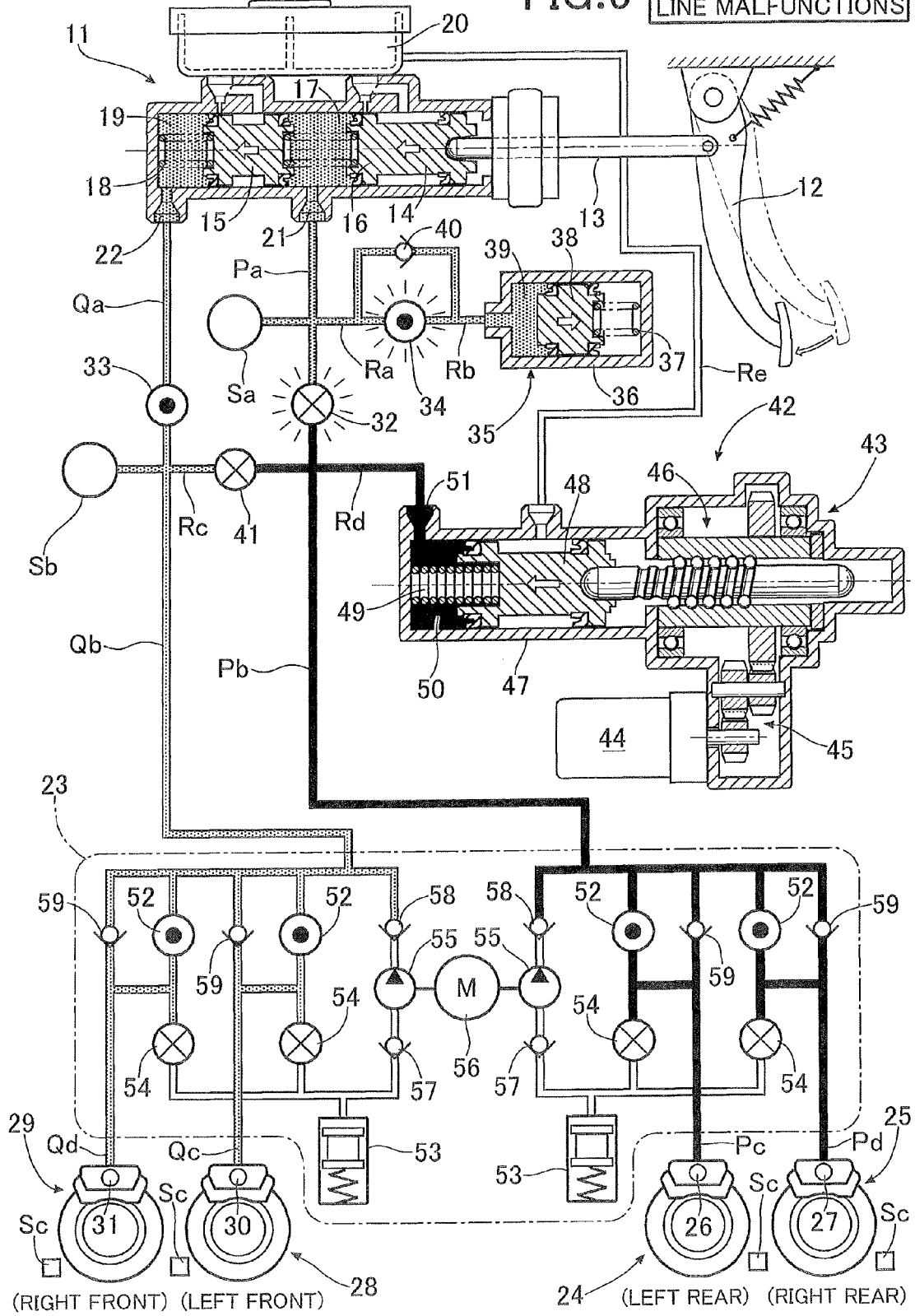
FIG.5 WHEN FLUID PATH LINE MALFUNCTIONS

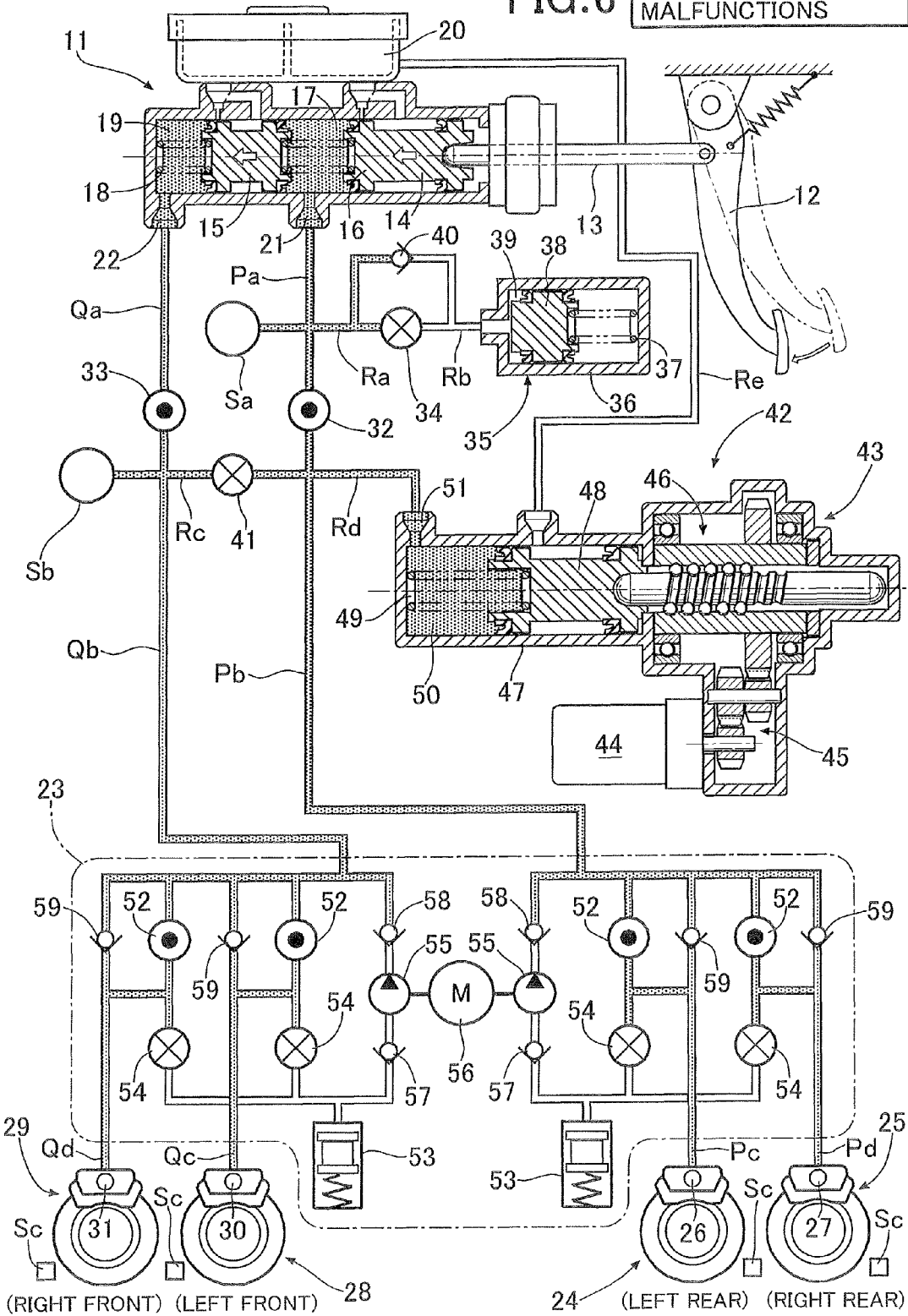
FIG.6 WHEN POWER SUPPLY MALFUNCTIONS

VEHICLE BRAKE DEVICE AND VEHICLE BRAKE DEVICE CONTROL METHOD

TECHNICAL FIELD

The present invention relates to a so-called BBW (brake by wire) type vehicle brake device that converts a driver's brake pedal operation into an electrical signal and operates a wheel cylinder by means of a brake fluid pressure generated by a slave cylinder that is controlled based on the electrical signal, and a control method therefor.

BACKGROUND ART

With regard to such a BBW type vehicle brake device, an arrangement that includes a tandem type master cylinder, a tandem type slave cylinder, a wheel cylinder of a first line, and a wheel cylinder of a second line, connects a first fluid pressure chamber of the master cylinder to the wheel cylinder of the first line via a first fluid pressure chamber of the slave cylinder, connects a second fluid pressure chamber of the master cylinder to the wheel cylinder of the second line via a second fluid pressure chamber of the slave cylinder, operates the wheel cylinders of the first and second lines by means of a brake fluid pressure generated by the slave cylinder when the system is normal, and operates the wheel cylinders of the first and second lines by means of a brake fluid pressure generated by the master cylinder when there is an abnormality of the system is known from Patent Document 1 below.

PRIOR ART DOCUMENTS

Patent Documents

Patent Document 1: Japanese Patent Application Laid-open No. 2009-161130

SUMMARY OF THE INVENTION

Problems to be Solved by the Invention

However, in the above-mentioned conventional arrangement, since the slave cylinder needs to be provided with the first and second fluid pressure chambers corresponding to the wheel cylinder of the first line and the wheel cylinder of the second line, there is the problem that the structure of the slave cylinder becomes complicated, which contributes to an increase in cost. If in order to solve this problem the arrangement is such that a brake fluid pressure is supplied from a slave cylinder provided with a single fluid pressure chamber to the wheel cylinders of the first and second lines, when the slave cylinder malfunctions and the wheel cylinder is operated by means of a brake fluid pressure generated by the master cylinder, if a malfunction such as liquid leakage occurs in the wheel cylinder of one of the first and second lines, there is a possibility that the braking force of the wheel cylinders of both the first and second lines will be lost.

The present invention has been accomplished in light of the above-mentioned circumstances, and it is an object thereof to provide a BBW type brake device in which, when one of two brake lines malfunctions, backup can be carried out by a slave cylinder with a simple structure that is equipped with a single fluid pressure chamber.

Means for Solving the Problems

In order to attain the above object, according to a first aspect of the present invention, there is provided a vehicle brake device comprising a master cylinder that is operated by a brake pedal to generate brake fluid pressure for two lines, a stroke simulator that is connected to at least one output port of the master cylinder and into which is introduced a brake fluid from the master cylinder, a first fluid path that provides a connection between a first fluid pressure chamber of the master cylinder and a wheel cylinder of a first line, a second fluid path that provides a connection between a second fluid pressure chamber of the master cylinder and a wheel cylinder of a second line, a slave cylinder that is connected to the first fluid path and generates a brake fluid pressure by means of the driving force of an actuator, first and second master cut valves that are provided in the first and second fluid paths respectively on an upstream side relative to the slave cylinder and can block communication between the master cylinder and the wheel cylinders of the first and second lines, a third fluid path that provides communication between the first and second fluid paths on a downstream side relative to the first and second master cut valves, and a communication control valve that can block the third fluid path.

Further, according to a second aspect of the present invention, in addition to the first aspect, the slave cylinder comprises restricting means that restricts expansion of the volume of a fluid pressure chamber of the slave cylinder when a fluid pressure is externally applied to the fluid pressure chamber.

Furthermore, according to a third aspect of the present invention, in addition to the first or second aspect, the device comprises an auxiliary cut valve that is provided in at least one of the first and second fluid paths on a downstream side relative to the third fluid path and can block the brake fluid pressure from the slave cylinder, and a pressure reduction valve that is provided in each wheel cylinder on a downstream side relative to the auxiliary cut valve and can release the brake fluid pressure from the slave cylinder into a reservoir.

Moreover, according to a fourth aspect of the present invention, in addition to any one of the first to third aspects, a degree of opening of the communication control valve is adjustable.

Further, according to a fifth aspect of the present invention, in addition to the third aspect, the device comprises a first fluid pressure sensor that detects a brake fluid pressure generated by the master cylinder and a second fluid pressure sensor that detects a brake fluid pressure of the third fluid path or the first and second fluid paths between the first and second master cut valves and the auxiliary cut valve, the second fluid pressure sensor being provided in the second fluid path.

Furthermore, according to a sixth aspect of the present invention, there is provided a vehicle brake device control method for controlling operation of the vehicle brake device according to the first aspect, the method comprising a step of transmitting, in a state in which the communication control valve is closed, the master cut valve disposed in one fluid path, on the slave cylinder side, of the first and second fluid paths is closed, and the master cut valve in the other fluid path is opened, a brake fluid pressure generated by the slave cylinder to the fluid path on the slave cylinder side of the first and second fluid paths.

Moreover, according to a seventh aspect of the present invention, there is provided a vehicle brake device control method for controlling the operation of the vehicle brake device according to the third aspect, the method comprising a step of operating the slave cylinder in a state in which the communication control valve is opened, to generate a first brake fluid pressure, and a step of opening the pressure reduction valve and reducing the brake fluid pressure of the wheel cylinder of at least one of the first and second lines to a second brake fluid pressure, which is lower than the first brake fluid pressure.

A first output port 21 of an embodiment corresponds to the output port of the present invention, an in-valve 52 of the embodiment corresponds to the auxiliary cut valve of the present invention, and an out-valve 54 of the embodiment corresponds to the pressure reduction valve of the present invention.

Effects of the Invention

In accordance with the first aspect of the present invention, in a normal situation, the first and second fluid paths that are connected to each other via the third fluid path are both connected to the slave cylinder by opening the communication control valve while enabling brake pedal stroke by means of the stroke simulator in a state in which the first and second master cut valves are closed, thus enabling the wheel cylinders of the first and second lines to be operated by means of brake fluid pressure generated by the slave cylinder and thereby eliminating the need for a tandem type slave cylinder and simplifying the structure. Furthermore, when the slave cylinder becomes inoperable, by opening the first and second master cut valves and closing the communication control valve the wheel cylinders of the first and second lines can each be operated via the first and second fluid paths by means of brake fluid pressure generated by the first and second fluid pressure chambers of the master cylinder. In this process, since it is possible to block the interconnection between the first and second fluid paths by closing the communication control valve provided in the third fluid path, even if the wheel cylinder of one of the first and second lines suffers from a liquid leakage malfunction, operation of the wheel cylinder of the other line is enabled to thus ensure a minimum necessary braking force.

Furthermore, in accordance with the second aspect of the present invention, when fluid pressure is externally applied to the fluid pressure chamber of the slave cylinder, since expansion of the volume of the fluid pressure chamber is restricted by the restricting means, it is possible to prevent the brake fluid pressure from being decreased due to expansion of the volume of the fluid pressure chamber of the slave cylinder when the wheel cylinder is operated by means of brake fluid pressure generated by the master cylinder when the slave cylinder malfunctions.

Moreover, in accordance with the third aspect of the present invention, since the auxiliary cut valve, which can block the brake fluid pressure from the slave cylinder, is provided in the fluid path of at least one of the first and second fluid paths on the downstream side relative to the third fluid path, and the pressure reduction valve, which can release the brake fluid pressure from the slave cylinder into the reservoir, is provided for each wheel cylinder on the downstream side relative to the auxiliary cut valve, it is possible to individually reduce any brake fluid pressure generated by the slave cylinder and transmit it to the respective wheel cylinder, thereby independently controlling the brake fluid pressure acting on each slave cylinder and giving ABS operation or VSA operation.

Furthermore, in accordance with the fourth aspect of the present invention, since the degree of opening of the communication control valve is made adjustable, it is possible to reduce the brake fluid pressure that is to be transmitted to the second fluid path connected to the first fluid path via the communication control valve relative to the brake fluid pressure that is generated by the slave cylinder and transmitted to the first fluid path, thereby varying the brake fluid pressures acting on the wheel cylinders of the first and second lines.

Moreover, in accordance with the fifth aspect of the present invention, since there are provided the first fluid pressure sensor for detecting the brake fluid pressure generated by the master cylinder and the second fluid pressure sensor for detecting the brake fluid pressure of the third fluid path or the first and second fluid paths between the first and second master cut valves and the auxiliary cut valve, and the second fluid pressure sensor is provided not in the first fluid path directly connected to the slave cylinder but in the second fluid path connected to the slave cylinder via the communication control valve, when the communication control valve is closed and connection between the first and second fluid paths is blocked, it is possible to detect the brake fluid pressure of the first fluid path by means of the first fluid pressure sensor and detect the brake fluid pressure of the second fluid path by means of the second fluid pressure sensor.

Furthermore, in accordance with the sixth aspect of the present invention, since the brake fluid pressure generated by the slave cylinder is transmitted, among the first and second fluid paths, to the fluid path on the slave cylinder side in a state in which the communication control valve is closed, the master cut valve disposed, among the first and second fluid paths, in the fluid path on the slave cylinder side is closed, and the master cut valve of the other fluid path is opened; when a malfunction such as liquid leakage occurs in the wheel cylinder of one of the first and second lines, it is possible to supply brake fluid pressure from the master cylinder to the wheel cylinder of the other line, and when a malfunction such as liquid leakage occurs in the wheel cylinder of the other of the first and second lines, it is possible to supply brake fluid pressure from the slave cylinder to the wheel cylinder of the one line.

Moreover, in accordance with the seventh aspect of the present invention, since the slave cylinder is operated to generate the first brake fluid pressure in a state in which the communication control valve is opened and the first and second fluid paths are connected to each other, and the brake fluid pressure of the wheel cylinder of at least one of the first and second lines is reduced to the second brake fluid pressure, which is lower than the first brake fluid pressure, by opening the pressure reduction valve, it is possible to transmit different brake fluid pressures to the respective wheel cylinders and individually control the braking force of each wheel.

BRIEF DESCRIPTION OF DRAWINGS

FIG. 2 is a diagram for explaining the operation when braking normally or when regeneratively braking (first embodiment)

FIG. 3 is a diagram for explaining the operation when there is ABS control. (first embodiment)

FIG. 4 is a diagram for explaining the operation when there is VSA control. (first embodiment)

FIG. 5 is a diagram for explaining the operation when there is a malfunction in a fluid path. (first embodiment)

FIG. 6 is a diagram for explaining the operation when there is a malfunction in the power supply. (first embodiment)

EXPLANATION OF REFERENCE NUMERALS AND SYMBOLS

Figure 1:
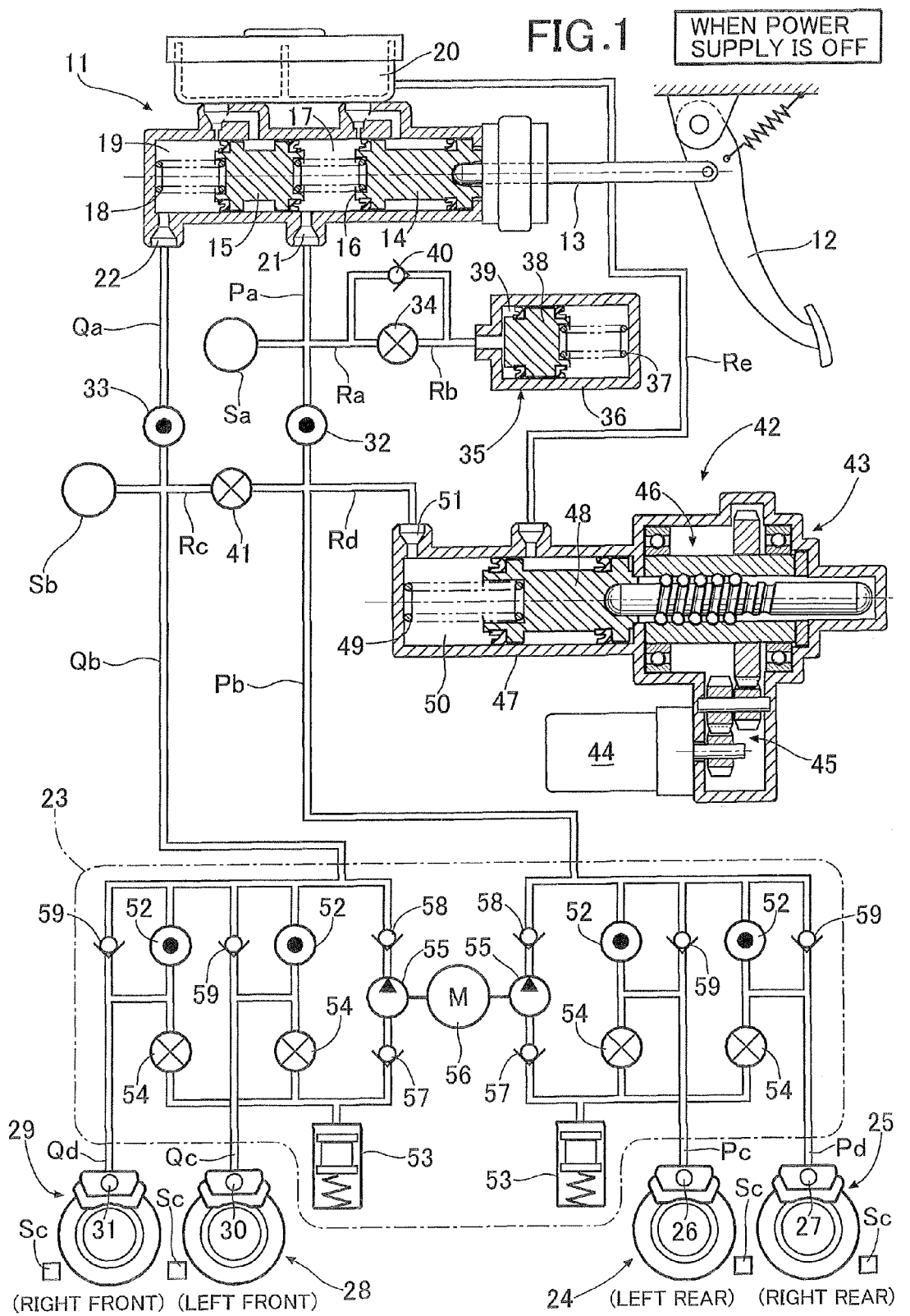
FIG. 1 is a fluid pressure circuit diagram (when a power supply is OFF) of a vehicle brake device. (first embodiment)

11 Master cylinder
12 Brake pedal

17 First fluid pressure chamber
19 Second fluid pressure chamber
21 First output port (output port)
26, 27 Wheel cylinder of first line
30, 31 Wheel cylinder of second line
32 First master cut valve
33 Second master cut valve
35 Stroke simulator
41 Communication control valve
42 Slave cylinder
43 Actuator
46 Ball screw mechanism (restricting means)
50 Fluid pressure chamber
52 In-valve (auxiliary cut valve)
53 Reservoir
54 Out-valve (pressure reduction valve)
Pa to Pd First fluid path
Qa to Qd Second fluid path
Rc Third fluid path
Sa First fluid pressure sensor
Sb Second fluid pressure sensor

MODE FOR CARRYING OUT THE INVENTION

A mode for carrying out the present invention is explained below by reference to FIG. 1 to FIG. 6.

First Embodiment

As shown in FIG. 1, a tandem type master cylinder 11 includes a first piston 14 and a second piston 15 disposed in front thereof, the first piston 14 being connected via a push rod 13 to a brake pedal 12 operated by a driver, a first fluid pressure chamber 17 housing a return spring 16 is defined between the first piston 14 and the second piston 15, and a second fluid pressure chamber 19 housing a return spring 18 is defined in front of the second piston 15. The first fluid pressure chamber 17 and the second fluid pressure chamber 19, which can communicate with a reservoir 20, include a first output port 21 and a second output port 22 respectively, the first output port 21 being connected to for example wheel cylinders 26 and 27 of disk brake devices 24 and 25 of left and right rear wheels (first line) via a fluid path Pa, a fluid path Pb, a hydraulic modulator 23, and fluid paths Pc and Pd, and the second output port 22 being connected to for example wheel cylinders 30 and 31 of disk brake devices 28 and 29 of left and right front wheels (second line) via a fluid path Qa, a fluid path Qb, the hydraulic modulator 23, and fluid paths Qc and Qd.

In this specification, the upstream side of the fluid paths Pa to Pd and the fluid paths Qa to Qd means the master cylinder 11 side, and the downstream side means the wheel cylinder 26, 27; 30, 31 side.

A first master cut valve 32, which is a normally open electromagnetic valve, is disposed between the fluid paths Pa and Pb, and a second master cut valve 33, which is a normally open electromagnetic valve, is disposed between the fluid paths Qa and Qb. Connected via a simulator valve 34, which is a normally closed electromagnetic valve, to fluid paths Ra and Rb that branch from the fluid path Pa on the upstream side of the first master cut valve 32 is a stroke simulator 35. The stroke simulator 35 is formed by slidably fitting into a cylinder 36 a piston 38 urged by a spring 37, and a fluid pressure chamber 39 formed on the side of the piston 38 opposite to the spring 37 communicates with the third fluid path Rb. Connected in parallel to the simulator valve 34 is a check valve 40 that only permits brake fluid to flow from the stroke simulator 35 side to the fluid path Pa side.

A communication control valve 41, which is a normally closed electromagnetic valve, is disposed in a third fluid path Rc that connects to each other the fluid path Pb and the fluid path Qb on the downstream side of the first and second master cut valves 32 and 33, and a slave cylinder 42 is connected to a fluid path Rd branching from the fluid path Pb. An actuator 43 for operating the slave cylinder 42 transmits rotation of an electric motor 44 to a ball screw mechanism 46 via a gear train 45. The slave cylinder 42 includes a cylinder main body 47 that is connected to the reservoir 20 of the master cylinder 11 via a fluid path Re, and a piston 48 that is slidably fitted into the cylinder main body 47 is urged by a return spring 49 in the backward direction. When the piston 48 is driven by the ball screw mechanism 46 of the actuator 43 in the forward direction, brake fluid pressure generated in a fluid pressure chamber 50 is transmitted to the fluid path Rd via an output port 51.

The structure of the hydraulic modulator 23, which is provided with ABS (antilock brake system) and VSA (vehicle stability assist) functions, is known, and the same structure is employed for the line of the disk brake devices 24 and 25 of the left and right rear wheels and the line of the disk brake devices 28 and 29 of the left and right front wheels. The line of the disk brake devices 24 and 25 of the left and right rear wheels is explained as being representative thereof; in-valves 52 and 52, which are a pair of normally open electromagnetic valves, are disposed between the fluid path Pb and the fluid paths Pc and Pd, and out-valves 54 and 54, which are normally closed electromagnetic valves, are disposed between a reservoir 53 and the fluid paths Pc and Pd on the downstream side of the in-valves 52 and 52. A hydraulic pump 55 is disposed between the reservoir 53 and the fluid path Pb, this hydraulic pump 55 being driven by an electric motor 56.

Check valves 57 and 58, which only permit brake fluid to flow from the reservoir 53 side to the fluid paths Pb and Qb side, are disposed on the intake side and the discharge side of each hydraulic pump 55. Furthermore, check valves 59, which only permit brake fluid to flow from the fluid paths Pc and Pd; Qc and Qd side to the fluid paths Pb and Qb side, are connected in parallel to each in-valve 62.

Connected to the fluid path Pa is a first fluid pressure sensor Sa for detecting the fluid pressure thereof, and connected to the fluid path Qb is a second fluid pressure sensor Sb for detecting the fluid pressure thereof. The first fluid pressure sensor Sa, the second fluid pressure sensor Sb, and wheel speed sensors Sc for detecting the wheel speed of each wheel are connected to an electronic control unit, which is not illustrated, that is connected to the first and second master cut valves 32 and 33, the simulator valve 34, the communication control valve 41, the slave cylinder 42, and the hydraulic modulator 23.

The operation of the mode for carrying out the present invention having the above-mentioned arrangement is now explained.

First, normal braking operation in a normal situation is explained by reference to FIG. 2.

In a normal situation when the system is functioning normally, when the first fluid pressure sensor Sa provided in the fluid path Pa detects the brake pedal 12 being depressed by the driver, the first and second master cut valves 32 and 33, which are normally open electromagnetic valves, are energized and thus close, the simulator valve 34, which is a normally closed electromagnetic valve, is energized and thus opens, and the communication control valve 41, which is a normally closed electromagnetic valve, is energized and thus opens. At the same time as the above, the actuator 43 of the slave cylinder 42 operates and the piston 48 moves forward, thereby generating a brake fluid pressure in the fluid pressure chamber 50.

Since at this time the communication control valve 41, which is a normally closed electromagnetic valve, is energized and thus opens, the brake fluid pressure generated by the slave cylinder 42 is transmitted to the fluid path Pb and the fluid path Qb connected to the fluid path Pb via the third fluid path Rc, and is transmitted from the two fluid paths Pb and Qb to the wheel cylinders 26 and 27; 30 and 31 of the disk brake devices 24 and 25; 28 and 29 via the opened in-valves 52 of the hydraulic modulator 23, thus braking each wheel.

Furthermore, the brake fluid pressure generated by the first fluid pressure chamber 17 of the master cylinder 11 is transmitted to the fluid pressure chamber 39 of the stroke simulator 35 via the opened simulator valve 34 to move the piston 38 against the spring 37, thus allowing a stroke of the brake pedal 12 and generating a simulated pedal reaction force to eliminate any disagreeable sensation for the driver.

Controlling the operation of the actuator 43 of the slave cylinder 42 so that the brake fluid pressure due to the slave cylinder 42 detected by the fluid pressure sensor Sb provided in the fluid path Qb has a magnitude corresponding to the brake fluid pressure due to the master cylinder 11 detected by the fluid pressure sensor Sa provided in the fluid path Pa enables a braking force corresponding to the amount of operation inputted by the driver into the brake pedal 12 to be generated in the disk brake devices 24 and 25; 28 and 29.

Furthermore, when it is desired to make the brake fluid pressure transmitted to the wheel cylinders 30 and 31 of the first line (rear wheels) and the brake fluid pressure transmitted to the wheel cylinders 26 and 27 of the second line (front wheels) transiently different, the braking force of the front wheel can be made lower than the braking force of the rear wheel by opening the communication control valve 41 with a variable degree of opening at any intermediate degree of opening.

Furthermore, in the case of a hybrid vehicle in which for example the front wheels are driven by a motor/generator, control is carried out by decreasing the fluid pressure braking force of the front wheels connected to the motor/generator by an amount corresponding to the braking force that is generated by regenerative braking of the motor/generator when the vehicle is decelerating, so that the total braking force is made to coincide with a target value. In such a case, as described above, controlling the communication control valve 41 at a predetermined intermediate degree of opening enables the fluid pressure braking force of the front wheels to be transiently reduced.

The operation of ABS control in a normal situation is now explained by reference to FIG. 3.

During the above-mentioned braking in a normal situation, when based on the output of the wheel speed sensors Sc it is detected that the slip rate of a wheel has increased and there is a tendency for it to lock, the operating state of the slave cylinder 42 is maintained, and in this state the hydraulic modulator 23 is operated to thus prevent the wheel from locking That is, when there is a tendency for the predetermined wheel to lock, in a state in which the in-valve 52 communicating with the wheel cylinder of the disk brake device of the wheel is closed and transmission of brake fluid pressure from the slave cylinder 42 is blocked, a pressure decrease operation in which the out-valve 54 is opened to thus release the brake fluid pressure of the wheel cylinder to the reservoir 53 and subsequently a maintenance operation in which the out-valve 54 is closed to thus maintain the brake fluid pressure of the wheel cylinder are carried out, thus decreasing the braking force so that the wheel does not lock.

If, as a result, the wheel speed recovers and the slip rate decreases, a pressure increase operation in which the in-valve 52 is opened to thus increase the brake fluid pressure of the wheel cylinder is carried out, thereby increasing the braking force on the wheel. If the wheel again has a tendency to lock due to this pressure increase operation, the above-mentioned pressure decrease, maintenance, and pressure increase are carried out again, and repeating them enables the maximum braking force to be generated while suppressing locking of the wheel. In this process, brake fluid that has flowed into the reservoir 53 is returned to the fluid paths Pb and Qb on the upstream side by means of a hydraulic pump 55.

FIG. 3 shows a state in which the brake fluid pressure of the wheel cylinder 26 of the left rear wheel is maintained, the brake fluid pressure of the wheel cylinder 27 of the right rear wheel is decreased, and the brake fluid pressure of the wheel cylinders 30 and 31 of the left and right front wheels are increased.

The operation of VSA control in a normal situation is now explained by reference to FIG. 4.

VSA control achieves stability of behavior by making the braking force of the inner turning wheel different from the braking force of the outer turning wheel to thus generate a yaw moment, and preventing lateral slip of the vehicle by this yaw moment. There is the difference that whereas ABS control is carried out only when braking, VSA control is also carried out when the vehicle is turning even if not accompanied by braking. In the present embodiment, control based on the operation of VSA is shown as a mode for carrying out pressure increase/pressure decrease control independently for four wheels, but the mode for carrying out pressure increase/pressure decrease control independently for four wheels is not limited to the time when VSA is being carried out. The operation of pressure decrease, maintenance, and pressure increase of the brake fluid pressure transmitted to the wheel cylinders 26 and 27; 30 and 31 of respective wheels is the same as that of the above-mentioned ABS control, but since it is possible to control the pressure by controlling the amount of drive of the slave cylinder 42 in normal VSA control, the pressure increase function of the hydraulic pumps 55 and 55 can be omitted, and they may have only the function of circulation.

FIG. 4 shows a state in which the brake fluid pressure of the wheel cylinder 26 of the left rear wheel is maintained, the brake fluid pressure of the wheel cylinder 27 of the right rear wheel and the wheel cylinder 31 of the right front wheel is decreased, and the brake fluid pressure of the wheel cylinder 30 of the left front wheel is increased.

The operation when a malfunction such as liquid leakage occurs in the wheel cylinders 26 and 27 of the first line or the wheel cylinders 30 and 31 of the second line is now explained by reference to FIG. 5.

In a case in which a malfunction such as liquid leakage occurs in at least one of the wheel cylinders 26 and 27 of the left and right rear wheels (first line) when the system is normal, in an arrangement in which all of the wheel cylinders 26 and 27; 30 and 31 of first and second lines are operated by a slave cylinder 42 having only a single fluid pressure chamber 50, there is a possibility that the braking force will be lost completely due to the liquid leakage.

In the present embodiment, in a state in which communication between the malfunctioning wheel cylinders (in FIG. 5 either the wheel cylinders 26 and 27 of the first line or the wheel cylinders 30 and 31 of the second line) is blocked by closing the communication control valve 41 and the first master cut valve 32 is closed, the second master cut valve 33 is opened. Because of this, the brake fluid pressure from the master cylinder 11 independently acts on the fluid path Qb, and the brake fluid pressure from the slave cylinder 42 independently acts on the fluid path Pb; even if one of the wheel cylinders 26 and 27 of the first line or the wheel cylinders 30 and 31 of the second line malfunctions, the braking force can be ensured by operating the other without any problems.

The operation when the slave cylinder 42 becomes inoperable due to a malfunction of a power supply, etc. is now explained by reference to FIG. 6.

When the power supply malfunctions, the first and second master cut valves 32 and 33, which are normally open electromagnetic valves, automatically open, the simulator valve 34 and the communication control valve 41, which are normally closed electromagnetic valves, automatically close, the in-valves 52, which are normally open electromagnetic valves, automatically open, and the out-valves 54, which are normally closed electromagnetic valves, automatically close. In this state, the brake fluid pressure generated in the first and second fluid pressure chambers 17 and 19 of the master cylinder 11 passes through the first and second master cut valves 32 and 33 and the in-valves 52 without being absorbed by the stroke simulator 35, to thus operate the wheel cylinders 26 and 27; 30 and 31 of the disk brake devices 24 and 25; 30 and 31 of the wheels, and a braking force can be generated without problems.

In this process, if the brake fluid pressure generated by the master cylinder 11 acts on the fluid pressure chamber 50 of the slave cylinder 42 and makes the piston 48 move backward, there is a possibility that the volume of the fluid pressure chamber 50 will expand and the pressure of the brake fluid pressure will decrease; if an attempt is made to maintain the brake fluid pressure the stroke of the brake pedal 12 will increase. However, in accordance with the present embodiment, since backward movement of the ball screw mechanism 46 of the slave cylinder 42 is suppressed if a load from the piston 48 side is inputted, any increase in the volume of the fluid pressure chamber 50 is suppressed. A member for restricting backward movement of the piston 48 may be provided separately for when the slave cylinder 42 malfunctions. In this case, a structure in which drive resistance is not increased during normal operation is desirable.

Furthermore, when the power supply malfunctions, since the communication control valve 41 is closed, the fluid paths Pa to Pd of the first line and the fluid paths Qa to Qd of the second line are completely separated; even if the fluid path of one line suffers from a liquid leakage malfunction, the braking force of the other line can be maintained, and redundancy can be further enhanced.

If the power supply malfunctions in a state in which the brake pedal 12 is depressed, the simulator valve 34, which is a normally closed electromagnetic valve, automatically closes to trap the brake fluid in the stroke simulator 35; there is a possibility that the volume of brake fluid will become insufficient, but since in such a case the brake fluid of the stroke simulator 35 passes through the check valve 40 and is returned to the master cylinder 11 side, no problem occurs.

As hereinbefore described, in accordance with the present embodiment, when the system is normal, in a state in which the first and second master cut valves 32 and 33 are closed and the simulator valve 34 is opened, the communication control valve 41 is opened so as to connect to the slave cylinder 42 both the first and second fluid paths Pb to Pd; Qb to Qd connected to each other via the third fluid path Rc, thereby operating the wheel cylinders 26, 27; 30 and 31 of the first and second lines by means of brake fluid generated by the slave cylinder 42 while enabling stroke of the brake pedal 12 by means of the stroke simulator 35. This enables the slave cylinder 42 having only the single fluid pressure chamber 50 to be used instead of a tandem type slave cylinder, thus simplifying the structure of the brake device.

Furthermore, when the slave cylinder 42 becomes inoperable due to a malfunction of the power supply, opening the first and second master cut valves 32 and 33 and closing the communication control valve 41 enables the wheel cylinders 26 and 27; 30 and 31 of the first and second lines respectively to be operated by means of the brake fluid pressure generated by the first and second fluid pressure chambers 17 and 19 of the master cylinder via the first and second fluid paths Pa to Pd; Qa to Qd. Moreover, in this process, since the communication control valve 41 is closed so as to block the interconnection between the first and second fluid paths Pa to Pd; Qa to Qd, when there is a malfunction such as liquid leakage in the wheel cylinders 26 and 27; 30 and 31 of one of the first and second lines, the operation of the wheel cylinders 26 and 27; 30 and 31 of the other line is enabled to thus ensure the braking force.

Furthermore, since the hydraulic modulator 23 is disposed on the downstream side relative to the third fluid path Rc, controlling the opening and closing of the in-valves 52 enables the brake fluid pressure generated by the slave cylinder 42 to be freely adjusted and independently supplied to the wheel cylinders 26 and 27; 30 and 31.

Moreover, since the out-valves 54, which can release the brake fluid pressure from the slave cylinder 42 to the reservoir 53, are provided on the downstream side relative to the in-valves 52 of the hydraulic modulator 23, any brake fluid pressure generated by the slave cylinder 42 can be decreased individually by opening the out-valves 54 and transmitted to each of the wheel cylinders 26 and 27; 30 and 31, and this enables the brake fluid pressure acting on each of the wheel cylinders 26 and 27; 30 and 31 to be independently controlled, thus giving ABS operation or VSA operation.

Furthermore, if brake fluid pressure from the master cylinder 11 is applied to the fluid pressure chamber 50 of the slave cylinder 42 when there is an abnormality of the system, since expansion of the volume of the fluid pressure chamber 50 is restricted by the ball screw mechanism 46, it is possible to suppress any decrease in the slave cylinder 42 of the brake fluid pressure generated by the master cylinder 11.

Moreover, since the degree of opening of the communication control valve 41 can be adjusted, it is possible to decrease the brake fluid pressure transmitted to the second fluid path Qb to Qd connected to the first fluid path Pb to Pd via the communication control valve 41 relative to the brake fluid pressure generated by the slave cylinder 42 and transmitted to the first fluid path Pb to Pd, thus making the brake fluid pressures acting on the wheel cylinders 26 and 27; 30 and 31 of the first and second lines transiently different.

Furthermore, since there are provided the first fluid pressure sensor Sa for detecting the brake fluid pressure generated by the master cylinder 11 and the second fluid pressure sensor Sb for detecting the brake fluid pressure of the fluid path Qb between the second master cut valve 33 and the in-valves 52, the first fluid pressure sensor Sa is disposed in the first fluid path Pa to Pd directly connected to the slave cylinder 42, and the second fluid pressure sensor Sb is provided not in the first fluid path Pa to Pd directly connected to the slave cylinder 42 but in the second fluid path Qa to Qd connected to the slave cylinder 42 via the communication control valve 41, when the communication control valve 41 is opened to provide communication between the first and second fluid paths Pa to Pd; Qa to Qd and when the communication control valve 41 is closed to block the connection between the first and second fluid paths Pa to Pd; Qa to Qd, it is possible to detect abnormalities of the first master cut valve 32 and the communication control valve 41 based on values detected by the first and second fluid pressure sensors Sa and Sb.

A mode for carrying out the present invention is explained above, but the present invention may be modified in a variety of ways as long as the modifications do not depart from the spirit and scope thereof.

For example, the brake device of the embodiment is provided with the hydraulic modulator 23, but the present invention may also be applied to a brake device that is not provided with the hydraulic modulator 23.

Furthermore, in the embodiment, the slave cylinder 42 is controlled based on a value detected by the first fluid pressure sensor Sa, but the slave cylinder 42 may be controlled based on an amount of operation of the brake pedal 12 detected by a stroke sensor.

Moreover, in the embodiment, the wheel cylinders 26 and 27 of the left and right rear wheels are defined as the first line, and the wheel cylinders 30 and 31 of the left and right front wheels are defined as the second line, but the wheel cylinder 30 of the left front wheel and the wheel cylinder 27 of the right rear wheel may be defined as the first line, and the wheel cylinder 31 of the right front wheel and the wheel cylinder 26 of the left rear wheel may be defined as the second line, or the wheel cylinders 30 and 31 of the left and right front wheels may be defined as the first line, and the wheel cylinders 26 and 27 of the left and right rear wheels may be defined as the second line.

The invention claimed is:

1. A vehicle brake device comprising:
   a master cylinder that is operated by a brake pedal to generate brake fluid pressure for two fluid supply lines,
   a stroke simulator that is connected to at least one output port of the master cylinder and into which is introduced a brake fluid from the master cylinder,
   a first fluid path that provides a connection between a first fluid pressure chamber of the master cylinder and a wheel cylinder of a first one of said fluid supply lines,
   a second fluid path that provides a connection between a second fluid pressure chamber of the master cylinder and a wheel cylinder of a second one of said fluid supply lines,
   a slave cylinder that is connected to the first fluid path and generates a brake fluid pressure by means of the driving force of an actuator,
   first and second master cut valves that are provided in the first and second fluid paths respectively on an upstream side relative to the slave cylinder and can block communication between the master cylinder and the wheel cylinders of the first and second lines,
   a third fluid path that provides communication between the first and second fluid paths on a downstream side relative to the first and second master cut valves, and
   a communication control valve that is provided in the third fluid path and, when closed, blocks fluid communication between the first and second fluid paths via the third fluid path,
   wherein the communication control valve is placed in communication with the slave cylinder at all times via only one of the first and second fluid paths.

2. The vehicle brake device according to claim 1, wherein the slave cylinder comprises restricting means that restricts expansion of the volume of a fluid pressure chamber of the slave cylinder when a fluid pressure is externally applied to the fluid pressure chamber.

3. The vehicle brake device according to claim 1, wherein the device comprises an auxiliary cut valve that is provided in at least one of the first and second fluid paths on a downstream side relative to the third fluid path and that can block the brake fluid pressure from the slave cylinder, and a pressure reduction valve that is provided in each wheel cylinder on a downstream side relative to the auxiliary cut valve and can release the brake fluid pressure from the slave cylinder into a reservoir.

4. The vehicle brake device according to claim 1, wherein a degree of opening of the communication control valve is adjustable.

5. The vehicle brake device according to claim 3, wherein the device comprises a first fluid pressure sensor that detects a brake fluid pressure generated by the master cylinder and a second fluid pressure sensor that detects a brake fluid pressure of the third fluid path or the first and second fluid paths between the first and second master cut valves and the auxiliary cut valve, the second fluid pressure sensor being provided in the second fluid path.

6. A vehicle brake device control method for controlling operation of the vehicle brake device according to claim 1, the method comprising
   a step of transmitting, in a state in which the communication control valve is closed, the master cut valve disposed in one fluid path, on the slave cylinder side, of the first and second fluid paths is closed, and the master cut valve in the other fluid path is opened, a brake fluid pressure generated by the slave cylinder to the fluid path on the slave cylinder side of the first and second fluid paths.

7. A vehicle brake device control method for controlling the operation of the vehicle brake device according to claim 3, the method comprising
   a step of operating the slave cylinder in a state in which the communication control valve is opened, to generate a first brake fluid pressure, and
   a step of opening the pressure reduction valve and reducing the brake fluid pressure of the wheel cylinder of at least one of the first and second lines to a second brake fluid pressure, which is lower than the first brake fluid pressure.

8. The vehicle brake device according to claim 2, wherein the device comprises an auxiliary cut valve that is provided in at least one of the first and second fluid paths on a downstream side relative to the third fluid path and can block the brake fluid pressure from the slave cylinder, and a pressure reduction valve that is provided in each wheel cylinder on a downstream side relative to the auxiliary cut valve and can release the brake fluid pressure from the slave cylinder into a reservoir.

9. The vehicle brake device according to claim 2, wherein a degree of opening of the communication control valve is adjustable.

10. The vehicle brake device according to claim 3, wherein a degree of opening of the communication control valve is adjustable.

11. The vehicle brake device according to claim 1, wherein the slave cylinder has only a single piston and has only a single fluid pressure chamber formed therein proximate said single piston.

12. A vehicle brake device comprising:
   a master cylinder that is operated by a brake pedal to generate brake fluid pressure for two fluid supply lines,
   a stroke simulator that is selectively connectable to at least one output port of the master cylinder, and into which is introduced a brake fluid from the master cylinder, a first one of said fluid supply lines providing a first fluid path that provides a connection between a first fluid pressure chamber of the master cylinder and a first wheel cylinder, a second one of said fluid supply lines providing a second fluid path that provides a connection between a second fluid pressure chamber of the master cylinder and a second wheel cylinder, a slave cylinder that is connected to the first fluid path and which is operable to selectively generate a brake fluid pressure by means of the driving force of an actuator, said slave cylinder having only a single piston and having a single fluid pressure chamber formed therein proximate said single piston, first and second master cut valves that are provided in the first and second fluid paths respectively on an upstream side relative to the slave cylinder, and that are operable to selectively block communication between the master cylinder and the first and second wheel cylinders, a third fluid path that selectively provides communication between the first and second fluid paths on a downstream side relative to the first and second master cut valves, and a communication control valve that is provided in the third fluid path and, when closed, blocks fluid communication between the first and second fluid paths via the third fluid path, wherein the communication control valve is placed in fluid communication with the slave cylinder, without any other valve interposed therebetween.

13. The vehicle brake device according to claim 12, wherein the slave cylinder comprises a ball screw mechanism that restricts expansion of the volume of the single fluid pressure chamber of the slave cylinder when a fluid pressure is externally applied to the fluid pressure chamber.

14. The vehicle brake device according to claim 12, wherein the brake device further comprises:
 an auxiliary cut valve that is provided in at least one of the first and second fluid paths on a downstream side relative to the third fluid path, said auxiliary cut valve selectively operable to block the brake fluid pressure from the slave cylinder, and
 a pressure reduction valve that is provided in each wheel cylinder on a downstream side relative to the auxiliary cut valve, said pressure reduction valve operable to selectively release the brake fluid pressure from the slave cylinder into a reservoir.

15. The vehicle brake device according to claim 12, wherein a degree of opening of the communication control valve is adjustable.

16. The vehicle brake device according to claim 14, wherein the brake device further comprises a first fluid pressure sensor that detects a brake fluid pressure generated by the master cylinder, and a second fluid pressure sensor that detects a brake fluid pressure of the third fluid path or the first and second fluid paths between the first and second master cut valves and the auxiliary cut valve, the second fluid pressure sensor being provided in the second fluid path.

\* \* \* \* \*